United States Patent
Killough

(10) Patent No.: US 9,429,679 B2
(45) Date of Patent: *Aug. 30, 2016

(54) SYSTEMS AND METHODS FOR RESERVOIR SIMULATION

(71) Applicant: Landmark Graphics Corporation, Houston, TX (US)

(72) Inventor: John Edwin Killough, Austin, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/631,983

(22) Filed: Feb. 26, 2015

(65) Prior Publication Data

US 2015/0168599 A1 Jun. 18, 2015

Related U.S. Application Data

(63) Continuation of application No. 13/545,610, filed on Jul. 10, 2012, now Pat. No. 8,994,739.

(51) Int. Cl.
*G06T 13/00* (2011.01)
*G01V 99/00* (2009.01)

(52) U.S. Cl.
CPC ..... *G01V 99/005* (2013.01); *G01V 2210/6248* (2013.01)

(58) Field of Classification Search
CPC .......... G01V 1/345; G01V 2210/644; G01V 99/005; G06F 17/5009
See application file for complete search history.

(56) References Cited

U.S. PATENT DOCUMENTS

2007/0282582 A1* 12/2007 Saaf ................................. 703/10
2012/0004892 A1* 1/2012 Pita et al. ....................... 703/10

* cited by examiner

*Primary Examiner* — Hau Nguyen
(74) *Attorney, Agent, or Firm* — Crain Caton & James; Alan Bryson

(57) ABSTRACT

Systems and methods for structured and unstructured reservoir simulation using parallel processing on GPU clusters to balance the computational load.

18 Claims, 3 Drawing Sheets

SYSTEMS AND METHODS FOR RESERVOIR SIMULATION

CROSS-REFERENCE TO RELATED APPLICATIONS

This application claims the priority of U.S. patent application Ser. No. 13/545,610, filed Jul. 10, 2012, which is incorporated herein by reference.

STATEMENT REGARDING FEDERALLY SPONSORED RESEARCH

Not applicable.

FIELD OF THE INVENTION

The present invention generally relates to systems and methods for reservoir simulation. More particularly, the present invention relates to structured and unstructured reservoir simulation using parallel processing on GPU clusters to balance the computational load.

BACKGROUND OF THE INVENTION

An elusive goal of reservoir simulation has been the ability to efficiently utilize massively parallel processing. The recent advent of the heterogeneous processor with Central Processing Units ("CPU") tightly coupled to Graphics Processing Units ("GPU") has complicated this goal. An additional complication is that the next generation reservoir simulator must be able to easily handle unstructured grids such that complex geologies and well configurations can be accurately modeled.

Although existing simulators can handle unstructured grids, further advances are required to fully and efficiently utilize the most current computer hardware. One problem, for example, plaguing unstructured simulators is the inability to adequately distribute (balance) the computational load (data) among thousands of computational engines without totally disrupting the solution algorithm. Without a proper load-balancing strategy, efficient massively parallel processing on multiple GPUs, also referred to as a GPU cluster, becomes impossible.

Domain decomposition techniques are a natural way to efficiently use parallel computers with attached general purpose GPUs. Domain decomposition techniques divide a computation into a local part, which may be done without any inter-processor communication, and a part that involves communication between neighboring and distant processors. In addition to achieving computational load balance, decompositions based on the Fiedler Vector, like the decomposition illustrated in FIG. 1, have been shown to exhibit characteristics on parallel computers such as a GPU cluster that are well-behaved for linear solvers. Unfortunately, however, the computational load for reservoir simulation is dynamic, especially in situations involving geomechanical compaction and multi-component near-critical flash calculations. This issue is addressed by the dynamic load-balancing technique described in the thesis entitled "*Dynamic Load Balancing Using a Transportation Algorithm*" by Tongyuan Song and John Killough ("*Song and Killough*"). This load-balancing strategy can efficiently utilize the heterogeneous GPU cluster by allocating repetitive imbalanced calculations to GPU's while the CPU is performing other tasks.

Unfortunately, the very act of attempting to achieve load balance often destroys the ability of conventional unstructured solvers to converge efficiently. Even multi-colored unstructured solvers such as those based on incomplete LU factorization ("ILU") or algebraic multigrid ("AMG") cannot adequately cope with the poorly structured matrix, which results from a decomposition with thousands of domains. Although AMG may continue to converge well, the message-passing overhead associated with a large decomposition significantly reduced its parallel efficiency. To overcome this, an algorithm that takes advantage of the heterogeneous GPU cluster is required.

One particular algorithm that takes advantage of the heterogeneous GPU cluster is sometimes referred to as multi-grid semi-coarsening. The results of this algorithm are illustrated in comparing FIG. 2A (fine domains) and FIG. 2B (coarsened grid). A particular variant of this algorithm, which uses an intelligently coarsened grid to accelerate local Crout version ILU ("ILUC") solves is described in the article entitled "*Simulation of Compositional Reservoir Phenomena on a Distributed Memory Parallel Computer*" by J. E. Killough and Rao Bhogeswara. For intelligent coarsening, one of the recent layer-lumping and/or single phase areal aggregation algorithms described in the article entitled "*A New Efficient Averaging Technique for Scaleup of Multimillion-Cell Geologic Models*" by D. Li and D. Beckner may be used. In this manner, the amount of overhead is drastically reduced while achieving a solution whose computational work for convergence does not depend on the number of domains. With the acceleration of the ILUC solves using the heterogeneous GPU cluster, overall GPU cluster performance is substantially reduced. This technique has shown to work well in Intel's Spike linear solver, for example. Solutions for complex wells such as Extreme Reservoir Contact (ERC) wells with many lateral branches are a natural consequence of this development. That is, the additional semi-coarsening step simply enhances the ability of the linear solver to properly account for the complications added to properly solve for the pressure and saturation distributions of such wells. The heterogeneous computational environment also adds to the ability for the simulator to tackle the surface network solution on the conventional computational engines while the subsurface is being primarily solved on the heterogeneous GPU cluster.

The algorithms discussed above by their very nature allow rapid software development on a GPU cluster because the computational load for each GPU is limited to specific small kernels, which can be easily coded with the existing languages available for efficient parallel GPU software. With the combination of the existing message-passing interface ("MPI") based higher-level language for the cluster, the software implementation for the overall massively parallel simulator becomes readily achievable without having to wait for additional software tools to be developed. Previous implementations of these algorithms, however, required the use of the host CPU or processor and thus, reduced overall efficiency of the algorithms.

SUMMARY OF THE INVENTION

The present invention overcomes one or more deficiencies in the prior art by providing systems and methods for structured and unstructured reservoir simulation using parallel processing on GPU clusters to balance the computational load.

In one embodiment, the present invention includes a method for reservoir simulation, which comprises: i) distributing new fluid pressures and compositions determined for the reservoir to one or more GPUs wherein the new fluid pressures and compositions are distributed to each GPU with grid cells that are nearest multi-phase grid cells or source and sink terms; ii) performing a multi-phase flash calculation on each GPU that was distributed new fluid pressures and compositions with an unstable phase; and iii) performing a reservoir simulation using a result for each multi-phase flash calculation.

In another embodiment, the present invention includes a non-transitory program carrier device tangibly carrying computer executable instructions for reservoir simulation, the instructions being executable to implement: i) distributing new fluid pressures and compositions determined for the reservoir to one or more GPUs wherein the new fluid pressures and compositions are distributed to each GPU with grid cells that are nearest multi-phase grid cells or source and sink terms; ii) performing a multi-phase flash calculation on each GPU that was distributed new fluid pressures and compositions with an unstable phase; and iii) performing a reservoir simulation using a result for each multi-phase flash calculation.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The present invention utilizes the GPU to offload work in a redundant fashion to achieve load balance and performance enhancement. An unstructured grid allows computational elements that are not limited to cube-like elements or grid-cells. The techniques described herein therefore, have applicability to not only cube-like volumes but also to irregularly shaped elements with complex connectivities among the elements.

Method Description

Figure 1:
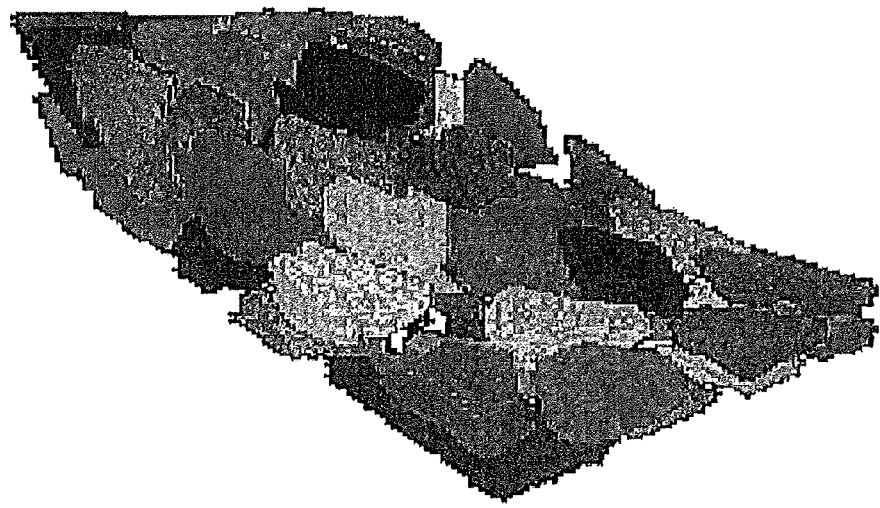
FIG. 1 illustrates decomposition of an unstructured grid using the Fiedler Vector.
Figure 2A:
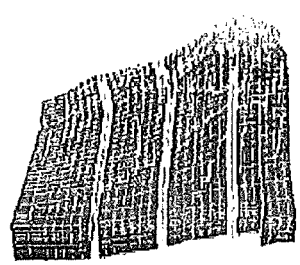
FIG. 2A illustrates a grid with fine domains.
Figure 2B:
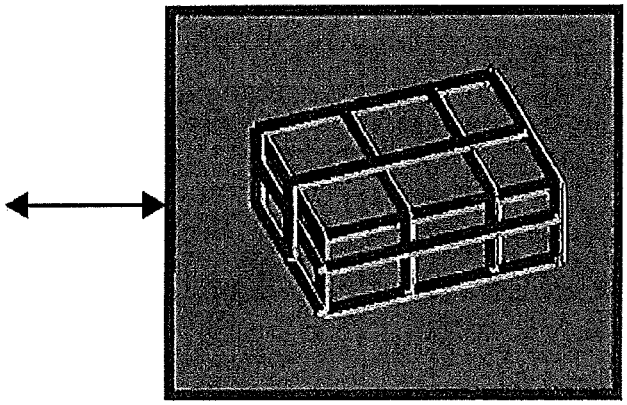
FIG. 2B illustrates a coarsened grid using a multi-grid semi-coarsening algorithm.
Figure 3:
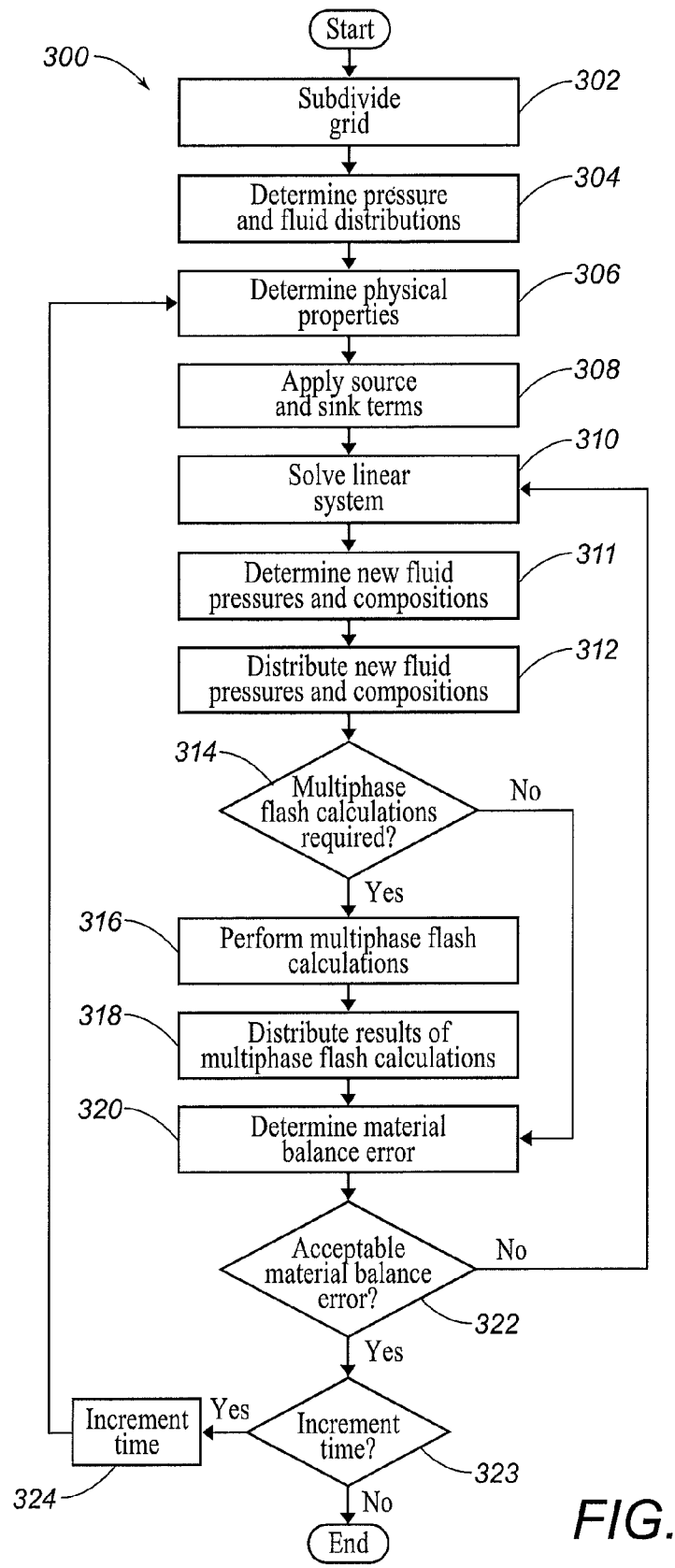
FIG. 3 is a flow diagram illustrating one embodiment of a method for implementing the present invention.

Referring now to FIG. 3, a flow diagram illustrates one embodiment of a method 300 for implementing the present invention.

In step 302, a predefined structured or unstructured grid is subdivided. The grid may be subdivided using an algorithm like the one described in the article entitled "*Numerical Solutions of Partial Differential Equations on Parallel Computers*" by A. M. Bruaset and A. Tveito or any well-known domain decomposition algorithm. Domain decomposition represents one class of geometric decomposition techniques that generally assign grid-cells to a domain or subdivision of the grid that are physically close to one another to achieve a balance in the computational work per domain for purposes more fully described in reference to step 310. The decomposition algorithm is generally linked to a parallel linear solver because, for many cases, the parallel linear solver dominates the simulator computations.

In step 304, pressure and fluid distributions are determined using standard techniques such as capillary-gravity equilibrium or other well-known user defined distributions. In this step, the compositions of the in-place fluids are known and can be used to determine the pressure and fluid distributions and the components that exist in each phase using multi-phase flash calculations. Capillary-gravity equilibrium is established in the usual well-known manner by first establishing a density gradient and a pressure gradient based on the in-place fluid compositions. Once the pressure distributions are determined by capillary-gravity equilibration, the fluid distributions can be established using the multi-phase flash calculations. The process is iterated until the pressure and fluid distributions converge with minimal changes between iterations. The distribution of the compositions of the in-place fluids to each phase (i.e. the pressure and fluid distributions) are available to determine the physical properties, such as the phase relative permeabilities and associated mobilities, in step 306.

In step 306, physical properties, such as phase-relative permeabilities and fluid viscosities, are determined from look-up tables of user input data or correlations using the results from step 304. Given the fluid compositions, the pressure distributions and the fluid distributions from step 304, fluid viscosities, for example, can be determined using known correlations or may simply be determined from look-up tables of user input data. Similarly, given the fluid saturations of each phase and the respective pressure and fluid distributions from step 304, relative permeability values may be determined, for example, from look up tables of user input data.

In step 308, source and sink terms representing volumes of fluids produced or injected from actual well locations are applied in the simulator as a fixed amount of fluid to be withdrawn (sink) or injected (source) into each of the computational elements in the predefined grid as required by the results from step 306. For reservoir simulation, it is assumed that wells are completed at locations in the predefined grid representing the reservoir model and that these locations provide production (sink) or injection (source) of the oil, water, and/or gas phases based on the physical properties determined in step 306. That is, the physical properties determined in step 306 provide information the simulator needs to properly distribute the production and/or injection fluids to each of the computational elements.

In step 310, a linear system is solved for new pressures and/or composition changes using any well-known parallel linear solver. The linear system may be derived from a formulation-dependent Jacobian based on a discretization that may be used to solve the linear system. For example, if the implicit pressure, explicit saturation method ("IMPES") is used, the solver performs achieves a solution for a Jacobian whose equations have scalar (single value) components with seven non-zero elements in each equation for a structured grid. The discretization for a three-dimensional, fully-implicit finite-difference formulation, on the other hand, would involve a seven-point matrix stencil with $(n+1)\times(n+1)$ computational elements where (n) is the number of components being used to represent the hydrocarbon. The Jacobean itself is built by using a finite difference or finite volume representation of the grid that represents the reservoir model. The predefined grid is subdivided in step 302 in order that the computations can be distributed to different processors (CPU or GPU) for the parallel linear solver to achieve optimal computation efficiency. The subdivision of the predefined grid in step 302 thus, provides i) the discrete pieces of the reservoir model that will be solved in parallel and ii) each CPU and associated GPU with the results from steps 304, 306, and 308 that may be used to solve the linear system for the new pressures and/or composition changes. Parallel linear solvers often utilize multicolored algorithms to achieve high-parallel efficiency. Each attached GPU may be utilized in parallel to efficiently process the computationally intensive portions of the solution. When preconditioning with an ILU, for example, pieces of the decomposed Jacobian may be passed to each GPU and the ILU preconditioning equations solved in this step. The results may then be passed back to each CPU of the underlying parallel computer. Each GPU may take many forms and are connected through a high-speed interconnect or direct memory/cache access to each respective parallel CPU of a work station or GPU cluster. The use of a GPU to off-load the complex and numerous calculations of the parallel linear solver used in this step also results in a significant enhancement to parallel efficiency. The solution is a set of linear equations that represents a converged linear solution. Convergence is generally determined by measuring the difference between zero and the Euclidean norm of the difference between the linear solution multiplied by the Jacobian minus the right hand side vector of the linear equations. If this convergence criterion is less than a predefined quantity, convergence is assumed.

In step 311, new fluid pressures and compositions are determined for each grid-cell by simply adding the new pressures and composition changes from the linear solution in step 310 to each of the grid cells.

In step 312, the new fluid pressures and compositions from step 311 are distributed to each GPU with grid-cells nearest the multi-phase grid-cells or nearest the source and sink terms by a respectively linked CPU. All other grid-cells are calculated locally because there is only a small amount of composition change and therefore, are not included in the distribution.

In step 314, the method 300 determines if multi-phase flash calculations are required using well-known techniques such as, for example, a phase stability technique. If the phase is unstable, then multi-phase flash calculations are required and the method 300 proceeds to step 316. If the phase is stable, then multi-phase flash calculations are not required and the method 300 proceeds to step 320.

In step 316, a multi-phase flash calculation is performed on each GPU using the new fluid pressures and compositions distributed in step 312 and one of many well-known, multi-phase flash calculation techniques. The phase distributions that result from each multi-phase flash calculation are thus, readily available to each CPU linked to a respective GPU and substantially reduce overhead due to load imbalance. The multi-phase flash calculation on each GPU therefore, determines the distribution of new fluid pressures and compositions in each phase.

In step 318, the results of the multi-phase flash calculations from step 316 are distributed to a respective CPU. Steps 312-318 are referred to as a "complete broadcast" meaning that the results of the multi-phase flash calculations are distributed (broadcast) to each respectively linked CPU. A complete broadcast using each GPU to balance the load enables a more efficient structured or unstructured reservoir simulation by offloading the multi-phase flash calculation to each GPU and making the results available to each respectively linked CPU. Alternatively, a "partial broadcast" or an "optimal broadcast" may be used, instead. In a partial broadcast, large local pieces of the grid are overlapped such that step 314 only addresses the data distributed in step 312 and thus, step 316 requires fewer multi-phase flash calculations than a complete broadcast. In an optimal broadcast, a method like that described in *Song and Killough* may be used to perform the multi-phase flash calculations and avoid distributing each grid-cell to a respective GPU. This technique therefore, distributes each grid-cell in an optimal fashion to limit the overhead of passing the multi-phase flash calculations from each GPU to a respectively linked CPU. That is, an optimal broadcast achieves the goal of limiting both the number of multi-phase flash calculations and the amount of data that must be distributed to each CPU.

In step 320, a material balance error is determined by first calculating the amount of material that has moved into or out of each computational grid-cell using well-known material balance equations and the results from steps 312-318. The phase distributions from step 316 are used to determine the contents of each grid-cell. The total amount of material in each grid-cell is then summed for the new values and compared with the old values, including the effects of source and sink quantities, which are applied in step 308. The difference between the new values and the old values represents the material balance error.

In step 322, the method 300 determines if the material balance error is acceptable. The material balance error is acceptable if the difference between the new value and the old value compared in step 320 is less than a predetermined value representing an acceptable material balance error. If the material balance error is acceptable, then the method 300 proceeds to step 323. If the material balance error is not acceptable, then the method 300 returns to step 310 and repeats steps 310-322 using the new fluid pressures and compositions from the previous calculations in steps 310-320.

In step 323, the method 300 determines whether to increment time based upon a current time for the simulation compared to predetermined time to end the simulation. If the current time for the simulation equals the predetermined time to end the simulation, then the method 300 ends. If the current time for the simulation does not equal the predetermined time to end the simulation, then the method 300 proceeds to step 324.

In step 324, time is incremented by a pre-determined time step that may be the same as the time step used in steps 310-320. Time however, may be incremented by any predetermined increment depending on the method 300. The method 300 then returns to step 306. With each new time step, steps 306-323 are repeated.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. Nexus®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 4:
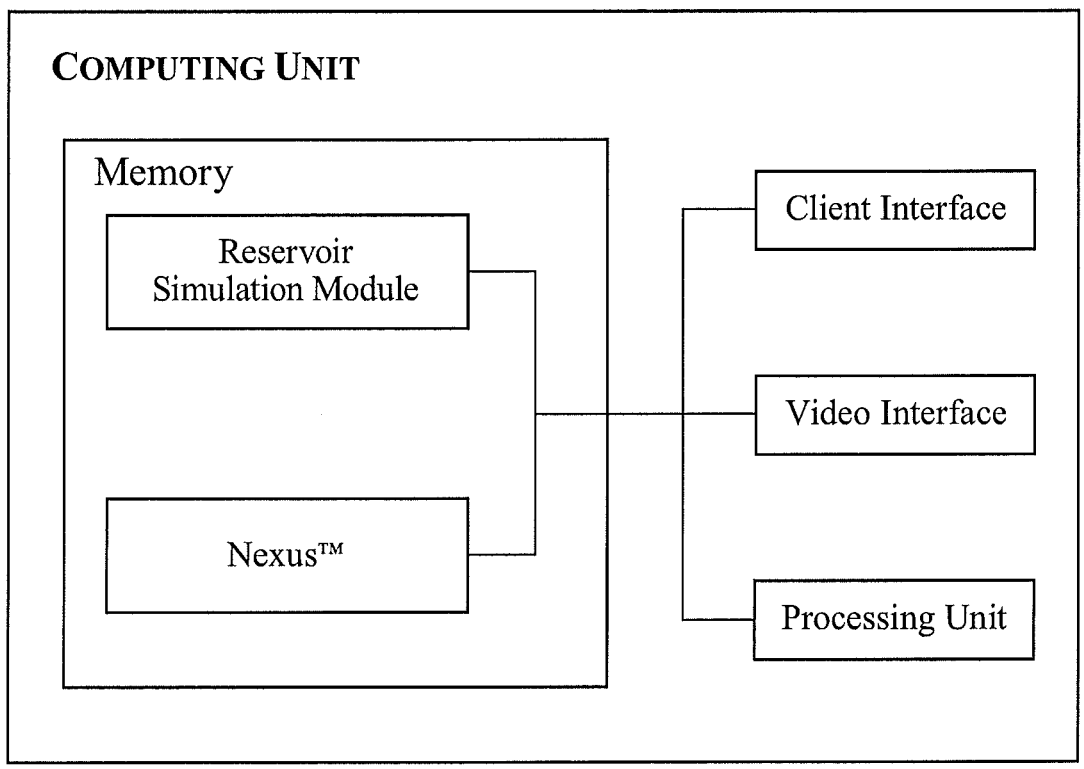
FIG. 4 is a block diagram illustrating one embodiment of a system for implementing the present invention.

Referring now to FIG. 4, a block diagram illustrates one embodiment of a system for implementing the present invention on a computer. The system includes a computing unit, sometimes referred to a computing system, which contains memory, application programs, a client interface, a video interface and a processing unit that includes a graphics processor or graphics card. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIG. 3. The memory therefore, includes a reservoir simulation module, which enables the methods illustrated and described in reference to FIG. 3 and integrates functionality from the remaining application programs illustrated in FIG. 4. In particular, Nexus™ may be used to execute the functions described in reference to steps 302-311 and 320-324 in FIG. 3 while the reservoir simulation module is used to execute the functions described in referenced to steps 312-318 in FIG. 3.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/non-volatile computer storage media or they may be implemented in the computing unit through application program interface ("API") or cloud computing, which may reside on a separate computing unit connected through a computer system or network. For example only, a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for reservoir simulation, which comprises:
    distributing new fluid pressures and compositions determined for the reservoir to one or more GPUs wherein the new fluid pressures and compositions are distributed to each GPU with grid cells that are nearest multi-phase grid cells or source and sink terms;

performing a multi-phase flash calculation on each GPU that was distributed new fluid pressures and compositions with an unstable phase; and performing a reservoir simulation using a result for each multi-phase flash calculation.

2. The method of claim 1, wherein the result for each multi-phase flash calculation represents a phase distribution.

3. The method of claim 2, wherein the result for each multi-phase flash calculation determines a distribution of the new fluid pressures and compositions with an unstable phase in each phase.

4. The method claim 1, wherein the grid cells belong to an unstructured grid representing the reservoir.

5. The method of claim 4, wherein the new fluid pressures and compositions are determined for the reservoir by adding new pressures and composition changes to each of the grid cells.

6. The method of claim 5, wherein the new pressures and composition changes represent a linear solution to a linear system solved with a parallel linear solver.

7. The method of claim 6, wherein the linear system comprises pressure and fluid distributions, physical properties, source terms and sink terms.

8. The method of claim 1, further comprising performing a multi-phase flash calculation on each GPU using the new fluid pressures and compositions with an unstable phase.

9. The method of claim 1, wherein the multi-phase flash calculation is performed using the new fluid pressures and compositions with an unstable phase.

10. A non-transitory program carrier device tangibly carrying computer executable instructions for reservoir simulation, the instructions being executable to implement:

distributing new fluid pressures and compositions determined for the reservoir to one or more GPUs wherein the new fluid pressures and compositions are distributed to each GPU with grid cells that are nearest multi-phase grid cells or source and sink terms;

performing a multi-phase flash calculation on each GPU that was distributed new fluid pressures and compositions with an unstable phase; and performing a reservoir simulation using a result for each multi-phase flash calculation.

11. The program carrier device of claim 10, wherein the result for each multi-phase flash calculation represents a phase distribution.

12. The program carrier device of claim 11, wherein the result for each multi-phase flash calculation determines a distribution of the new fluid pressures and compositions with an unstable phase in each phase.

13. The program carrier device claim 10, wherein the grid cells belong to an unstructured grid representing the reservoir.

14. The program carrier device of claim 13, wherein the new fluid pressures and compositions are determined for the reservoir by adding new pressures and composition changes to each of the grid cells.

15. The program carrier device of claim 14, wherein the new pressures and composition changes represent a linear solution to a linear system solved with a parallel linear solver.

16. The program carrier device of claim 15, wherein the linear system comprises pressure and fluid distributions, physical properties, source terms and sink terms.

17. The program carrier device of claim 10, further comprising performing a multi-phase flash calculation on each GPU using the new fluid pressures and compositions with an unstable phase.

18. The program carrier device of claim 10, wherein the multi-phase flash calculation is performed using the new fluid pressures and compositions with an unstable phase.

\* \* \* \* \*